(12) United States Patent
Noda

(10) Patent No.: US 9,778,446 B2
(45) Date of Patent: Oct. 3, 2017

(54) ZOOM LENS AND IMAGING APPARATUS

(71) Applicant: FUJIFILM Corporation, Tokyo (JP)

(72) Inventor: Taiga Noda, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 77 days.

(21) Appl. No.: 14/849,615

(22) Filed: Sep. 10, 2015

(65) Prior Publication Data
US 2015/0378139 A1 Dec. 31, 2015

Related U.S. Application Data

(63) Continuation of application No. PCT/JP2013/007646, filed on Dec. 26, 2013.

(30) Foreign Application Priority Data

Mar. 14, 2013 (JP) ................. 2013-051524

(51) Int. Cl.
*G02B 15/14* (2006.01)
*G02B 15/177* (2006.01)
*G02B 13/04* (2006.01)

(52) U.S. Cl.
CPC ........... *G02B 15/177* (2013.01); *G02B 13/04* (2013.01)

(58) Field of Classification Search
CPC ........ G02B 13/00; G02B 13/02; G02B 15/00; G02B 15/14; G02B 15/15; G02B 15/155
USPC ....... 359/641, 642, 676, 680, 682, 683, 686, 359/745, 747
See application file for complete search history.

(56) References Cited

U.S. PATENT DOCUMENTS

| 5,805,351 A | 9/1998 | Hayashi |
| 2010/0202064 A1 | 8/2010 | Nagaoka |
| 2011/0157715 A1* | 6/2011 | Ito ................. G02B 15/177 359/682 |

(Continued)

FOREIGN PATENT DOCUMENTS

| JP | 10-253885 | 9/1998 |
| JP | 2010-152147 | 7/2010 |

(Continued)

OTHER PUBLICATIONS

Chinese Official Action—201380074398.7—dated Sep. 12, 2016.
(Continued)

*Primary Examiner* — Ricky Mack
*Assistant Examiner* — Robert E Tallman
(74) *Attorney, Agent, or Firm* — Young & Thompson

(57) ABSTRACT

A zoom lens is constituted by, in order from the object side: a negative first lens group; an aperture stop; a positive second lens group; a negative third lens group; and a positive fourth lens group. All of the lens groups move along the optical axis when changing magnification from the wide angle end to the telephoto end such that the distance between the first lens group and the second lens group decreases and the distance between the second lens group and the third lens group increases. The first lens group is constituted by, in order from the object side, a 1-1 lens having a negative refractive power, a 1-2 lens having a negative refractive power, and a 1-3 lens having a positive refractive power. Conditional Formula (1) below is satisfied.

$$1.75 < ndave < 1.92 \qquad (1)$$

13 Claims, 11 Drawing Sheets

(56) References Cited

U.S. PATENT DOCUMENTS

| | | | |
|---|---|---|---|
| 2011/0279908 A1* | 11/2011 | Kon | G02B 15/177 |
| | | | 359/686 |
| 2012/0013994 A1 | 1/2012 | Tashiro | |
| 2012/0019931 A1* | 1/2012 | Ogata | G02B 15/173 |
| | | | 359/684 |
| 2012/0257285 A1 | 10/2012 | Kuzuhara et al. | |

FOREIGN PATENT DOCUMENTS

| | | |
|---|---|---|
| JP | 2010-181787 | 8/2010 |
| JP | 2011-133739 | 7/2011 |
| JP | 2012-022106 | 2/2012 |
| JP | 2012-027262 | 2/2012 |
| JP | 2012-226307 | 11/2012 |

OTHER PUBLICATIONS

International Search Report PCT/JP2013/007646 dated Apr. 8, 2014.

International Search Opinion PCT/ISA/237 dated Apr. 8, 2014, with partial English translation.

* cited by examiner

FIG.6
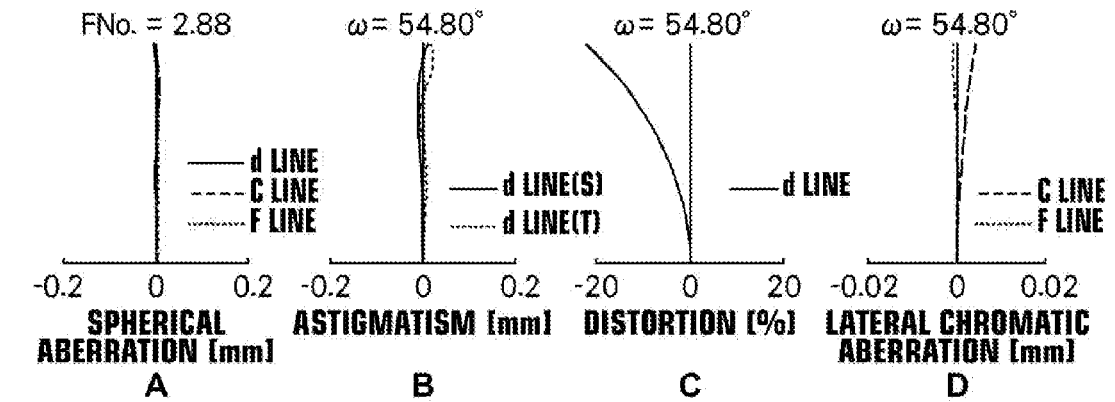
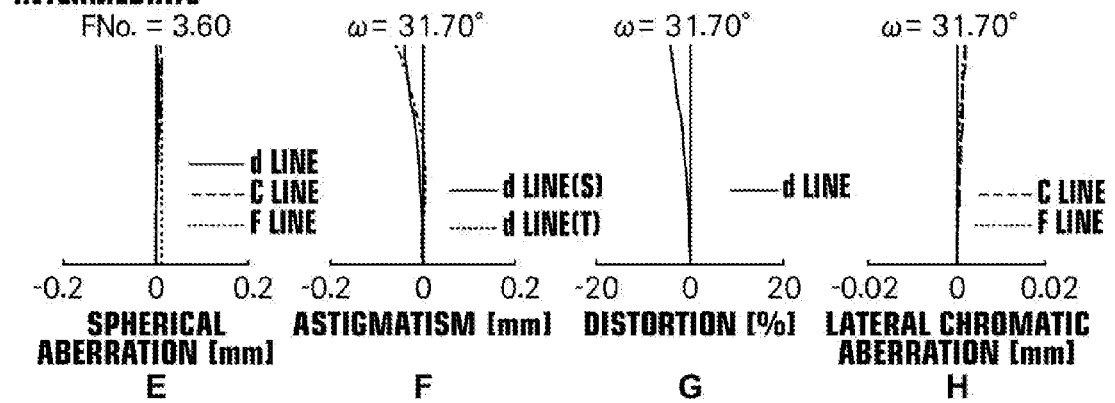
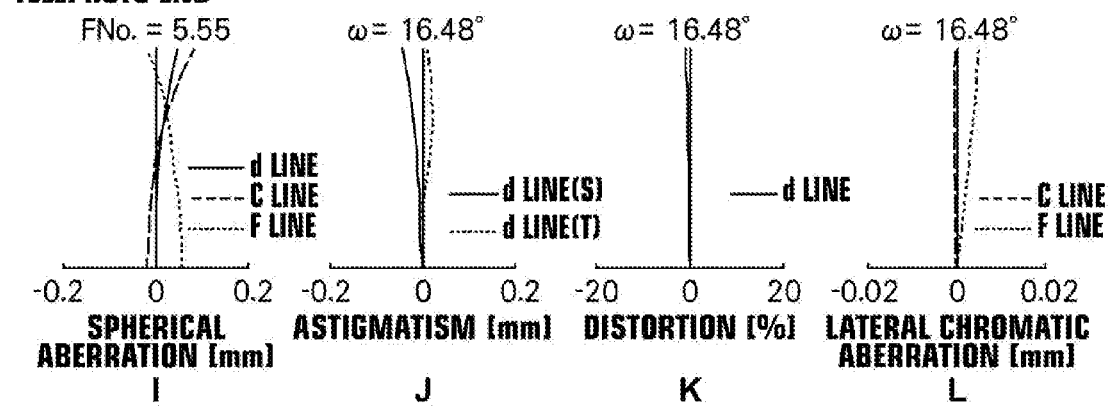

FIG.7
EXAMPLE 2
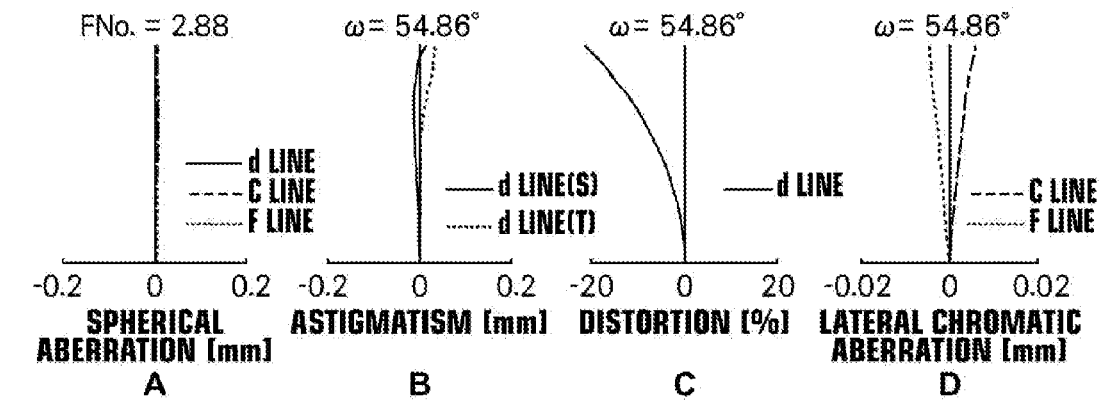
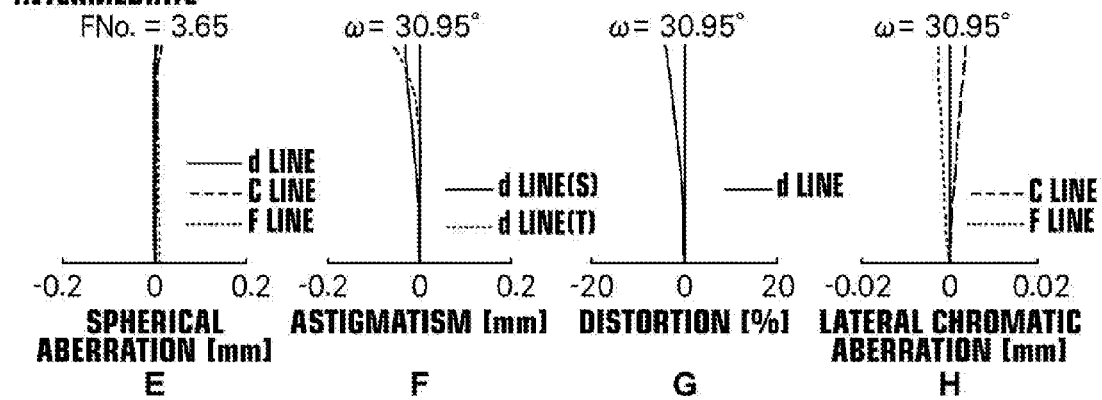
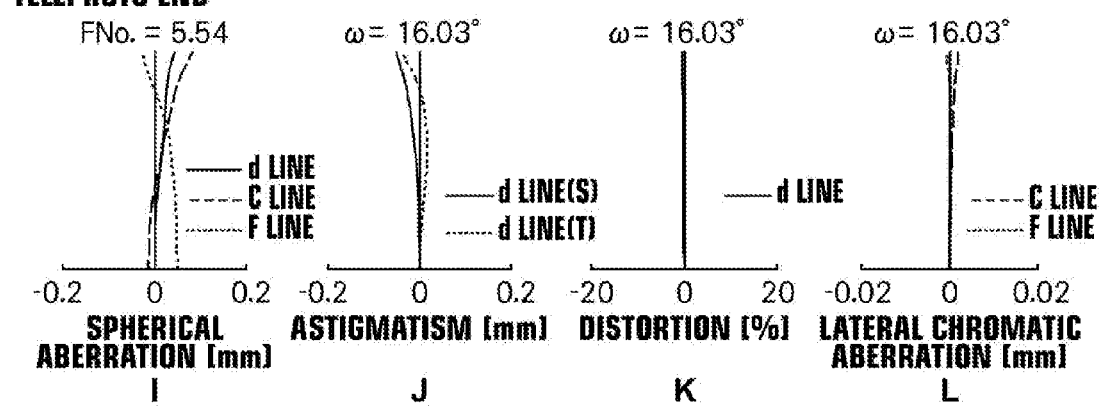

FIG.8
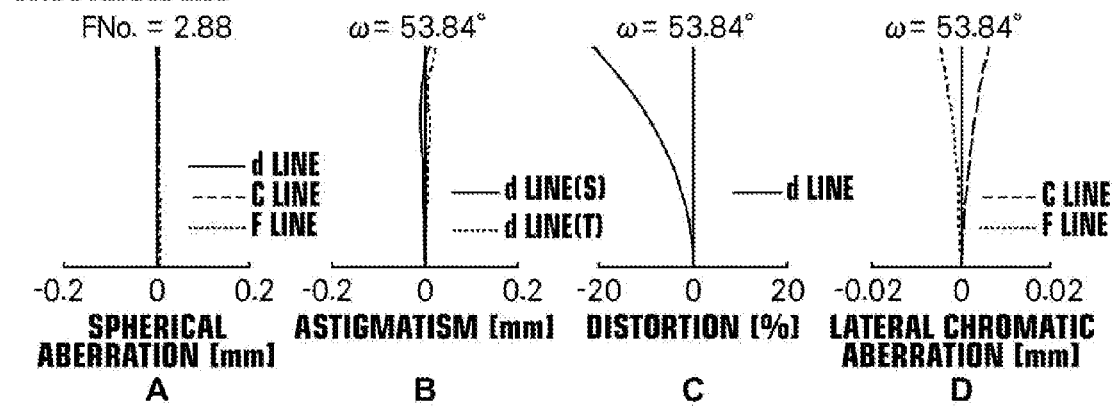
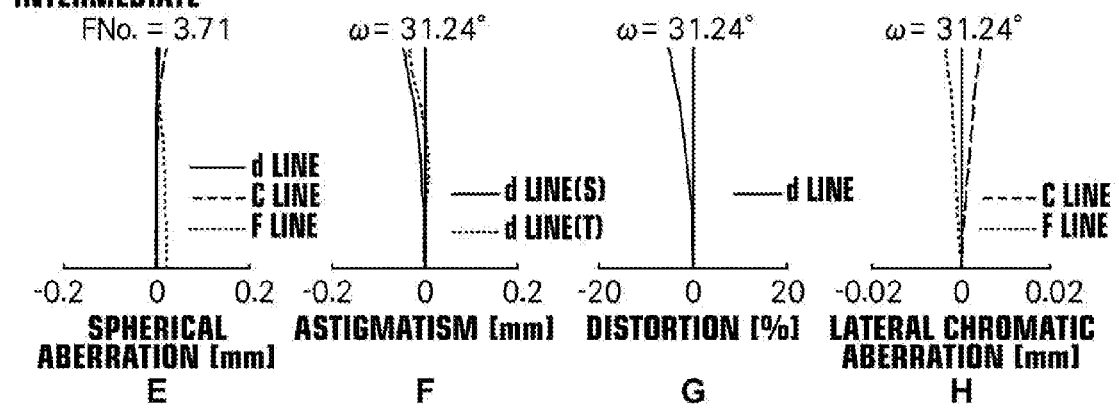
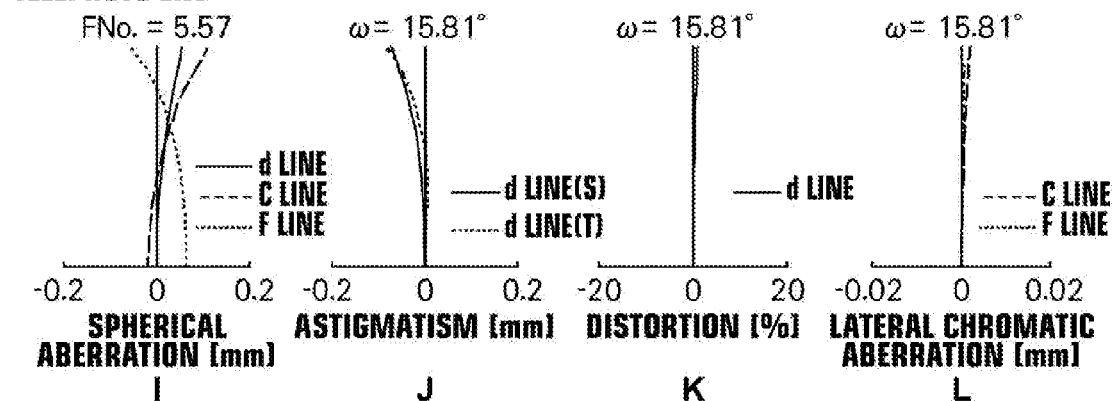

FIG.9
EXAMPLE 4
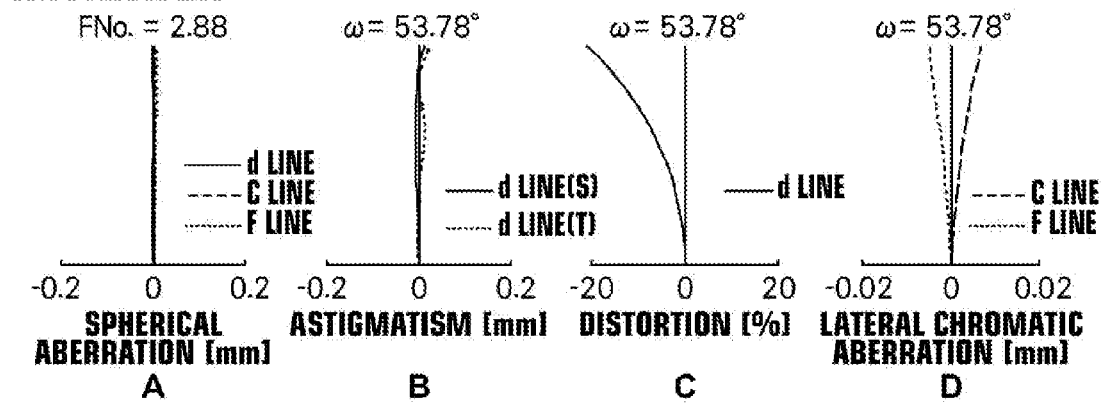
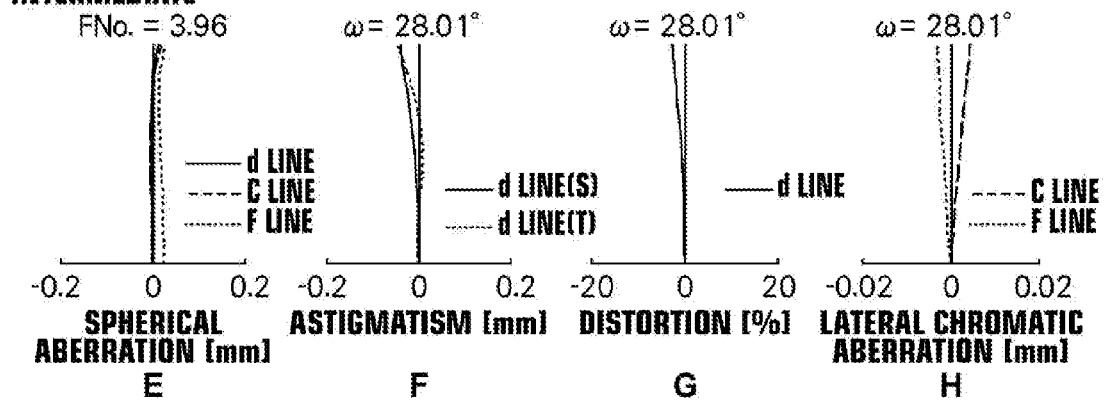
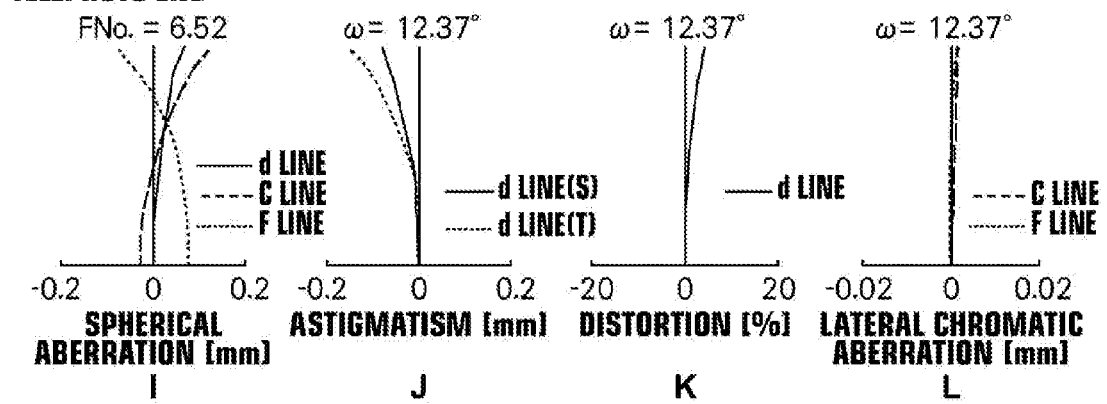

FIG.10 EXAMPLE 5

ZOOM LENS AND IMAGING APPARATUS

CROSS REFERENCE TO RELATED APPLICATIONS

The present application is a Continuation of PCT International Application No. PCT/JP2013/007646 filed on Dec. 26, 2013, which claims priority under 35 U.S.C. §119(a) to Japanese Patent Application No. 2013-051524 filed on Mar. 14, 2013. Each of the above application(s) is hereby expressly incorporated by reference in its entirety, into the present application.

BACKGROUND

The present disclosure is related to a zoom lens for use in electronic cameras such as a digital camera, a video camera, a broadcast camera, and a surveillance camera. The present disclosure is also related to an imaging apparatus equipped with the zoom lens.

A zoom type configuration, in which a first group having a negative refractive power and a second lens group having a positive refractive power are provided as leading lens groups in order from the object side to the image side, has been proposed as a simple configuration of a zoom lens. Recently, negative lead type zoom lenses of this type that also achieve a widened angle of view have been proposed in Japanese Unexamined Patent Publication Nos. 10(1998)-253885, 2010-181787, and 2012-226307. Widening of the angle of view is comparatively facilitated by adopting a negative lead configuration. However, there are certain trade offs in adopting such a configuration, and therefore various configurations have been proposed.

SUMMARY

The zoom lens disclosed as Example 1 in Japanese Unexamined Patent Publication No. 10(1998)-253885 is of a configuration having a first lens group with a negative refractive power, a second lens group with a positive refractive power, a third lens group with a negative refractive power, and a fourth lens group with a positive refractive power. The full angle of view is approximately 86 degrees, and this zoom lens realizes a wide angle of view, but the total length of the lens is great, and it cannot be said that a sufficient zoom ratio is secured.

In addition, the zoom lens disclosed as Example 1 in Japanese Unexamined Patent Publication No. 2010-181787 also has a wide angle of view. However, the full angle of view of this zoom lens is approximately 90 degrees, and it cannot be said that a sufficient widening of the angle of view is achieved compared to conventional zoom lenses.

The zoom lens disclosed as Example 1 in Japanese Unexamined Patent Publication No. 2012-226307 has a wider angle of view and a greater zoom ratio compared to those of conventional zoom lenses. However, the F number at the telephoto end is darker when compared to those of conventional zoom lenses.

The present disclosure has been developed in view of the foregoing circumstances. The present disclosure provides a zoom lens having a sufficiently wide angle of view, that secures a comparatively bright F number across the entire range from the wide angle end to the telephoto end, which has a short total length and is compact. The present disclosure also provides an imaging apparatus equipped with this zoom lens.

A zoom lens of the present disclosure consists of, in order from the object side to the image side:
a first lens group having a negative refractive power;
a stop;
a second lens group having a positive refractive power;
a third lens group having a negative refractive power; and
a fourth lens group having a positive refractive power;
all of the lens groups moving along the optical axis when changing magnification from the wide angle end to the telephoto end such that the distance between the first lens group and the second lens group decreases and the distance between the second lens group and the third lens group increases;
the first lens group consisting of, in order from the object side to the image side, a 1-1 lens having a negative refractive power, a 1-2 lens having a negative refractive power, and a 1-3 lens having a positive refractive power; and
the conditional formula below being satisfied:

$$1.75 < ndave < 1.92 \tag{1}$$

wherein ndave is the average refractive index of the 1-1 lens and the 1-2 lens with respect to the d line (wavelength: 587.6 nm).

In the zoom lens of the present disclosure, it is preferable for the 1-2 lens to have at least one aspherical surface, and for the conditional formula below to be satisfied.

$$0.80 < (r12f + r12r)/(r12f - r12r) < 1.70 \tag{2}$$

wherein r12f is the paraxial radius of curvature of the 1-2 lens toward the object side, and r12r is the paraxial radius of curvature of the 1-2 lens toward the image side.

In addition, it is preferable for the conditional formula below to be satisfied.

$$9.0 < TLw/fw < 12.5 \tag{3}$$

wherein TLw is the distance from the apex of the lens surface most toward the object side to an image formation plane at the wide angle end, and fw is the focal length of the entire zoom lens at the wide angle end.

In addition, it is preferable for the conditional formula below to be satisfied.

$$2.5 < X2/fw < 6.1 \tag{4}$$

wherein X2 is the amount of movement of the second lens group from the wide angle end to the telephoto end, and fw is the focal length of the entire zoom lens at the wide angle end.

In addition, it is preferable for the third lens group to consist only of a 3-1 lens having a negative refractive power, for the 3-1 lens to have at least one aspherical surface, and for the conditional formula below to be satisfied.

$$0.40 < (r31f + r31r)/(r31f - r31r) < 1.60 \tag{5}$$

wherein r31f is the paraxial radius of curvature of the 3-1 lens toward the object side, and r31r is the paraxial radius of curvature of the 3-1 lens toward the image side.

In addition, it is preferable for the second lens group to consist of, in order from the object side to the image side, a 2-1 lens having a positive refractive power, a 2-2 lens having a positive refractive power, a 2-3 lens having a negative refractive power, and a 2-4 lens having a positive refractive power.

In addition, it is preferable for focusing operations to be performed by moving the fourth lens group in the direction of the optical axis.

In addition, it is preferable for the fourth lens group to consist only of a 4-1 lens having a positive refractive power.

In addition, it is preferable for the conditional formula below to be satisfied.

$$1.78 < ndave < 1.88 \quad (1\text{-}1)$$

In addition, it is preferable for the 1-2 lens to have at least one aspherical surface, and for the conditional formula below to be satisfied.

$$1.00 < (r12f + r12r)/(r12f - r12r) < 1.50 \quad (2\text{-}1)$$

In addition, it is preferable for the conditional formula below to be satisfied.

$$10.0 < TLw/fw < 11.8 \quad (3\text{-}1)$$

In addition, it is preferable for the conditional formula below to be satisfied.

$$2.9 < X2/fw < 5.7 \quad (4\text{-}1)$$

In addition, it is preferable for the third lens group to consist only of a 3-1 lens having a negative refractive power, for the 3-1 lens to have at least one aspherical surface, and for the conditional formula below to be satisfied.

$$0.70 < (r31f + r31r)/(r31f - r31r) < 1.40 \quad (5\text{-}1)$$

An imaging apparatus of the present disclosure is characterized by being equipped with the zoom lens of the present disclosure described above.

The zoom lens of the present disclosure consists of, in order from the object side to the image side, the first lens group having a negative refractive power; the stop; the second lens group having a positive refractive power; the third lens group having a negative refractive power; and the fourth lens group having a positive refractive power. All of the lens groups move along the optical axis when changing magnification from the wide angle end to the telephoto end such that the distance between the first lens group and the second lens group decreases and the distance between the second lens group and the third lens group increases. The first lens group consists of, in order from the object side to the image side, a 1-1 lens having a negative refractive power, a 1-2 lens having a negative refractive power, and a 1-3 lens having a positive refractive power. In addition, the conditional formula below is satisfied. Therefore, it is possible to realize a zoom lens having a sufficiently wide full angle of view, that secures a comparatively bright F number across the entire range from the wide angle end to the telephoto end, which has a short total length and is compact.

$$1.75 < ndave < 1.92 \quad (1)$$

In addition, the imaging apparatus of the present disclosure is equipped with the zoom lens of the present disclosure. Therefore, miniaturization can be achieved, and high quality images can be obtained.

BRIEF DESCRIPTION OF THE DRAWINGS

FIG. 6 is a collection of diagrams (A through L) that illustrate aberrations of the zoom lens of Example 1.

FIG. 7 is a collection of diagrams (A through L) that illustrate aberrations of the zoom lens of Example 2.

FIG. 8 is a collection of diagrams (A through L) that illustrate aberrations of the zoom lens of Example 3.

FIG. 9 is a collection of diagrams (A through L) that illustrate aberrations of the zoom lens of Example 4.

DETAILED DESCRIPTION OF THE PREFERRED EMBODIMENTS

Figure 1:
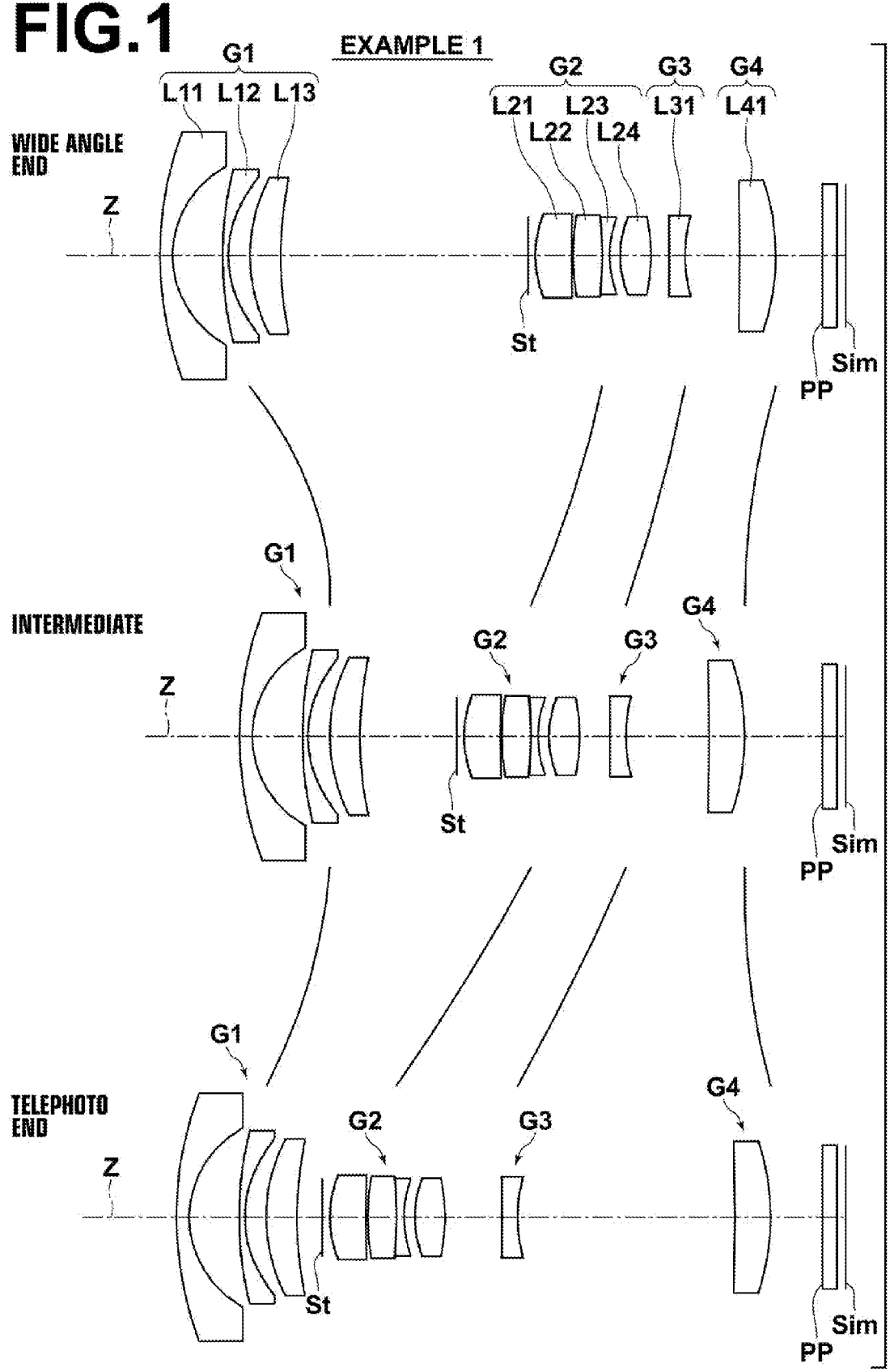
FIG. 1 is a collection of sectional diagrams that illustrate a first example of the configuration of a zoom lens according to an embodiment of the present disclosure (which is common with Example 1).

Hereinafter, embodiments of the present disclosure will be described in detail with reference to the attached drawings. FIG. 1 is a collection of sectional diagrams that illustrate the configuration of a zoom lens according to an embodiment of the present disclosure. The example of the configuration illustrated in FIG. 1 is the same as the configuration of a zoom lens of Example 1 to be described later. In FIG. 1, the left side is the object side and the right side is the image side. The movement trajectories of lens groups when changing magnification are schematically illustrated by solid lines.

As illustrated in FIG. 1, this zoom lens is constituted by a first lens group G1 having a negative refractive power, an aperture stop St, a second lens group G2 having a positive refractive power, a third lens group G3 having a negative refractive power, and a fourth lens group G4 having a positive refractive power, provided in this order along an optical axis Z from the object side. The zoom lens is configured such that all of the lens groups move along the optical axis to cause the distance between the first lens group G1 and the second lens group G2 to decrease and to cause the distance between the second lens group G2 and the third lens group G3 to increase when changing magnification from the wide angle end to the telephoto end. Note that the aperture stop St does not necessarily represent the size or the shape thereof, but the position thereof along the optical axis Z.

When this zoom lens is applied to an imaging apparatus, it is preferable for a cover glass, a prism, and various filters, such as an infrared cutoff filter and a low pass filter, to be provided between the optical system and an imaging surface Sim, depending on the configuration of the camera to which the lens is mounted. Therefore, FIG. 1 illustrates an example in which a plane parallel plate shaped optical member PP that presumes such filters is provided between the lens system and the imaging surface Sim.

The first lens group G1 is constituted by, in order from the object side to the image side, a 1-1 lens L11 having a negative refractive power, a 1-2 lens L12 having a negative refractive power, and a 1-3 lens L13 having a positive refractive power. The first lens group G1 is configured such that Conditional Formula (1) below is satisfied.

$$1.75 < ndave < 1.92 \quad (1)$$

wherein ndave is the average refractive index of the 1-1 lens and the 1-2 lens with respect to the d line (wavelength: 587.6 nm).

A widening of the angle of view and miniaturization can be realized, by configuring the zoom lens to have the first lens group G1 with a negative refractive power, the aperture stop St, the second lens group G2 with the positive refractive power, the third lens group G3 with the negative refractive power, and the fourth lens group G4 with the positive refractive power, provided in this order from the object side. At this time, the length of the first lens group G1 in the radial direction can be decreased while realizing a wide angle lens, by providing the aperture stop St at a position comparatively forward within the entirety of the lens. Such a configuration is advantageous from the viewpoint of miniaturization of the lens.

In addition, the amount of movement of each lens group when changing magnification can be suppressed, by configuring the zoom lens such that all of the lens groups move along the optical axis to cause the distance between the first lens group G1 and the second lens group G2 to decrease and to cause the distance between the second lens group G2 and the third lens group G3 to increase when changing magnification from the wide angle end to the telephoto end. Thereby, the movement mechanisms for each lens group can be miniaturized. As a result, the length of a lens barrel can be suppressed, and miniaturization of the lens can be realized while securing a sufficient zoom ratio. In addition, this configuration leads to suppressing the position of the stop from moving forward at the telephoto end, and a comparatively bright lens can be achieved throughout the entire zoom range. In addition, there is a tendency for the refractive powers of lens groups to increase when attempting to achieve a wide angle view. However, the refractive power of each lens group can be weakened by moving all of the lens groups. As a result, correction of various aberrations such as spherical aberration is facilitated.

The first lens group G1 is constituted by, in order from the object side to the image side, the 1-1 lens L11 having a negative refractive power, the 1-2 lens L12 having a negative refractive power, and the 1-3 lens L13 having a positive refractive power. Therefore, distortion and astigmatism which are generated within the first lens group G1 can be favorably corrected.

In addition, the radii of curvature of the negative lenses within the first lens group G1 can be prevented from increasing and the lenses can be prevented from becoming excessively thick, by configuring the zoom lens such that the value of ndave is not less than the lower limit defined in Conditional Formula (1). Note that if suppressing the radii of curvature of the negative lenses and miniaturization are prioritized, the negative power of the 1-1 lens L11 will become insufficient, which is disadvantageous from the viewpoint of widening the angle of view. In addition, the operative effect of bending light rays can be suppressed and distortion and astigmatism can be favorably corrected, by configuring the zoom lens such that the value of ndave is not greater than the upper limit defined in Conditional Formula (1). Note that more favorable properties can be obtained if Conditional Formula (1-1) below is satisfied.

$$1.78 < ndave < 1.88 \quad (1\text{-}1)$$

In the zoom lens of the present embodiment, it is preferable for the 1-2 lens L12 to have at least one aspherical surface, and for Conditional Formula (2) below to be satisfied. Distortion can be favorably corrected, by providing the 1-2 lens L12 with an aspherical surface. In addition, an aspherical surface will be provided on a lens having a smaller outer diameter compared to a case in which the 1-1 lens L11 is provided with an aspherical surface. Therefore, a comparatively inexpensive configuration can be adopted, and difficulties in production can also be decreased. In addition, the 1-2 lens L12 will not protrude greatly toward the 1-1 lens L11 by configuring the zoom lens such that the value of $(r12f+r12r)/(r12f-r12r)$ is not less than the lower limit defined in Conditional Formula (2). Therefore, astigmatism can be favorably corrected. In addition, it is also preferable to prevent the 1-2 lens L12 from becoming thick, also from the viewpoint of securing a sufficient distance between the 1-1 lens L11 and the 1-2 lens L12. In addition, balance can be maintained with the 1-3 lens L13 having a positive refractive power, by configuring the zoom lens such that the value of $(r12f+r12r)/(r12f-r12r)$ is not greater than the upper limit defined in Conditional Formula (2). Therefore, the generation of lateral chromatic aberration can be suppressed. Note that more favorable properties can be obtained if Conditional Formula (2-1) is satisfied.

$$0.80 < (r12f+r12r)/(r12f-r12r) < 1.70 \quad (2)$$

$$1.00 < (r12f+r12r)/(r12f-r12r) < 1.50 \quad (2\text{-}1)$$

wherein r12f is the paraxial radius of the surface of the 1-2 lens toward the object side, and r12r is the paraxial radius of the surface of the 1-2 lens toward the image side.

In addition, it is preferable for Conditional Formula (3) below to be satisfied. Achieving a wide angle of view is facilitated, and because it is easy to secure a sufficient number of lenses, the number of portions at which light rays are greatly bent can be decreased, by configuring the zoom lens such that the value of TLw/fw is not less than the lower limit defined in Conditional Formula (3). In addition, an increase in the total length of the lens can be suppressed and the lens can be compact, by configuring the zoom lens such that the value of TLw/fw is not greater than the upper limit defined in Conditional Formula (3). Note that more favorable properties can be obtained if Conditional Formula (3-1) is satisfied.

$$9.0 < TLw/fw < 12.5 \quad (3)$$

$$10.0 < TLw/fw < 11.8 \quad (3\text{-}1)$$

wherein TLw is the distance from the apex of the lens surface most toward the object side to an image formation plane at the wide angle end, and fw is the focal length of the entire zoom lens at the wide angle end.

In addition, it is preferable for Conditional Formula (4) below to be satisfied. A sufficient amount of movement of the second lens group G2, which bears the principal zooming function, can be secured, by configuring the zoom lens such that the value of X2/fw is not less than the lower limit defined in Conditional Formula (4). In addition, the position of the aperture stop St, which is provided forward of the second lens group G2, will be unlikely to separate from the image formation plane, by configuring the zoom lens such that the value of X2/fw is not greater than the upper limit defined in Conditional Formula (4). Therefore, the F number at the telephoto end can be kept small. Note that more favorable properties can be obtained by Conditional Formula (4-1) below being satisfied.

$$2.5 < X2/fw < 6.1 \quad (4)$$

$$2.9 < X2/fw < 5.7 \quad (4\text{-}1)$$

wherein X2 is the amount of movement of the second lens group from the wide angle end to the telephoto end, and fw is the focal length of the entire zoom lens at the wide angle end.

In addition, it is preferable for the third lens group G3 to consist only of a 3-1 lens L31 having a negative refractive power, for at least one surface of the 3-1 lens L31 to be an aspherical surface, and for Conditional Formula (5) below to be satisfied. Configuring the third lens group G3 to consist of only one lens is advantageous from the viewpoint of miniaturizing the entire zoom lens when the lens is in a retracted state. Further, fluctuations in field curvature during zooming operations can be suppressed more easily by the aspherical surface being provided. In addition, fluctuations in field curvature during zooming operations can be suppressed by configuring the zoom lens such that the value of (r31f+r31r)/(r31f−r31r) is not less than the lower limit defined in Conditional Formula (5). In addition, the distance between the apex of the front surface of the lens and the edge of the rear surface of the lens can be suppressed, by configuring the zoom lens such that the value of (r31f+r31r)/(r31f−r31r) is not greater than the upper limit defined in Conditional Formula (5). Therefore, the actual thickness of the lens will decrease, which is advantageous from the viewpoint of miniaturization. Note that more favorable properties can be obtained if Conditional Formula (5-1) below is satisfied.

$$0.40 < (r31f + r31r)/(r31f - r31r) < 1.60 \quad (5)$$

$$0.70 < (r31f + r31r)/(r31f - r31r) < 1.40 \quad (5\text{-}1)$$

wherein r31f is the paraxial radius of curvature of the 3-1 lens toward the object side, and r31r is the paraxial radius of curvature of the 3-1 lens toward the image side.

In addition, it is preferable for the second lens group G2 to consist of, in order from the object side to the image side, a 2-1 lens L21 having a positive refractive power, a 2-2 lens L22 having a positive refractive power, a 2-3 lens L23 having a negative refractive power, and a 2-4 lens L24 having a positive refractive power. Axial light beams can be bent gently after passing through the aperture stop St by adopting this configuration, which is advantageous from the viewpoint of correcting spherical aberration. In addition, this configuration facilitates correction of spherical aberration in a bright lens having a small F number, and further is advantageous from the viewpoint of correcting astigmatism at the wide angle end.

In addition, it is preferable for focusing operations to be performed by moving the fourth lens group G4 in the direction of the optical axis. By performing focusing operations using the fourth lens group G4, which does not have a large operative effect in changing magnification, fluctuations in aberrations can be suppressed when changing magnification and during focusing operations.

In addition, it is preferable for the fourth lens group G4 to consist only of a 4-1 lens L41 having a positive refractive power. A light lens will be moved during focusing operations by configuring the fourth lens group G4 to consist only of a single lens, which is advantageous in performing expedient focusing operations.

In addition, sufficient performance is defined as a half angle of view of 50° or greater at the wide angle end, a zoom ratio of 3.5 or greater, and an F number of 7 or less throughout the entire zoom range.

In the present zoom lens, a specific preferred material of the component provided most toward the object side is glass. Alternatively, a transparent ceramic material may be employed.

In the case that the present zoom lens is to be utilized in an environment in which the zoom lens is likely to be damaged, it is preferable for a protective multiple layer film coating to be administered. Further, a reflection preventing coating may be administered in order to reduce the amount of ghost light during use, in addition to the protective coating.

In addition, FIG. 1 illustrates an example in which the optical member PP is provided between the lens system and the imaging surface Sim. Alternatively, various filters such as low pass filters and filters that cut off specific wavelength bands may be provided among each of the lenses instead of being provided between the lens system and the imaging surface Sim. As a further alternative, coatings that have the same functions as the various filters may be administered on the surfaces of the lenses.

Next, examples of numerical values of the zoom lens of the present disclosure will be described.

First, the zoom lens of Example 1 will be described. FIG. 1 is a collection of sectional diagrams that illustrate the lens configuration of the zoom lens of Example 1. Note that the optical member PP is also illustrated, the left side is the object side, the right side is the image side, and the aperture stop St in the drawings do not necessarily represent the size or the shape thereof, but the position thereof along the optical axis Z, in FIG. 1 and FIGS. 2 through 5 that correspond to Examples 2 through 5 to be described later.

Basic lens data are shown in Table 1, data related to various items are shown in Table 2, data related to the distances among movable surfaces are shown in Table 3, and aspherical surface coefficients are shown in Table 4, for the zoom lens of Example 1. In the following description, the meanings of the symbols in the tables will be described for Example 1. The meanings of the symbols are basically the same for Examples 2 through 5.

In the lens data of Table 1, ith (i=1, 2, 3, . . . ) lens surface numbers that sequentially increase from the object side to the image side, with the lens surface at the most object side designated as first, are shown in the column Si. The radii of curvature of ith surfaces are shown in the column Ri, the distances between an ith surface and an i+1 st surface along the optical axis Z are shown in the column Di. The refractive indices of jth (j=1, 2, 3, . . . ) optical elements that sequentially increase from the object side to the image side, with the optical element at the most object side designated as first, with respect to the d line (wavelength: 587.6 nm) are shown in the column Ndj. The Abbe's numbers of the jth optical element with respect to the d line (wavelength: 587.6 nm) are shown in the column vdj.

Here, the signs of the radii of curvature are positive in cases that the surface shape is convex toward the object side, and negative in cases that the surface shape is convex toward the image side. The aperture stop St and the optical member PP are also included in the basic lens data. Text reading "(stop)" is indicated along with a surface number in the column of the surface numbers at the surface corresponding to the aperture stop. In addition, DD [i] is indicated in the column of the distances for distances that change while changing magnification. In addition, the lowermost value in the column Di is the distance between the surface of the optical member PP toward the image side and the imaging surface Sim.

Table 2 shows the values of the zoom magnification rates of the entire system, the focal lengths f', the back focus Bf', F values (F No.), the angles of view (2ω), at the wide angle end, at an intermediate position, and at the telephoto end, respectively, as the data related to various items.

In the basic lens data, the data related to various items, and the data related to the movable surfaces, degrees are used as the units for angles and mm are used as the units for lengths. However, it is possible for optical systems to be proportionately enlarged or proportionately reduced and utilized. Therefore, other appropriate units may be used.

In the lens data of Table 1, the symbol "*" is appended to the surface numbers of aspherical surfaces, and numerical values that represent the paraxial radii of curvature are shown as the radii of curvature of the aspherical surfaces. The data of Table 4 related to aspherical surface coefficients show the surface numbers of the aspherical surfaces and aspherical surface coefficients related to the aspherical surfaces. The aspherical coefficients are the values of coefficients KA and Am (m=3, 4, 5, . . . , 20) in formula (A) below.

$$Zd = C \cdot h^2 / \{1 + (1 - KA \cdot C^2 \cdot h^2)^{1/2}\} + \Sigma Am \cdot h^m \quad (A)$$

Zd is the depth of the aspherical surface (the length of a normal line from a point on the aspherical surface at a height h to a plane perpendicular to the optical axis in contact with the peak of the aspherical surface), h is height (the distance from the optical axis), C is the inverse of the paraxial radius of curvature, and KA and Am (m=3, 4, 5, . . . , 20) are aspherical surface coefficients.

TABLE 1

Example 1: Lens Data (N and ν are related to the d line)

| Si (Surface Number) | Ri (Radius of Curvature) | Di (Distance) | Ndj (Refractive Index) | νdj (Abbe's Number) |
|---|---|---|---|---|
| 1 | 20.6815 | 0.700 | 1.729157 | 54.68 |
| 2 | 5.8808 | 2.800 | | |
| *3 | 35.7143 | 0.300 | 1.882023 | 37.22 |
| *4 | 6.9411 | 1.200 | | |
| 5 | 10.0000 | 1.700 | 1.959060 | 17.47 |
| 6 | 22.0922 | DD[6] | | |
| 7 (stop) | ∞ | 0.400 | | |
| *8 | 6.4426 | 2.000 | 1.693500 | 53.20 |
| 9 | 62.1837 | 0.100 | | |
| 10 | 14.0536 | 1.610 | 1.592824 | 68.63 |
| 11 | −24.3953 | 0.400 | 1.688931 | 31.07 |
| 12 | 6.2482 | 0.600 | | |
| *13 | 5.5555 | 1.700 | 1.497103 | 81.56 |
| 14 | −11.2487 | DD[14] | | |
| 15 | −1230.1702 | 0.900 | 1.820798 | 42.71 |
| *16 | 10.0000 | DD[16] | | |
| 17 | −250.0225 | 2.000 | 1.772499 | 49.60 |
| 18 | −13.6843 | DD[18] | | |
| 19 | ∞ | 0.800 | 1.516798 | 64.20 |
| 20 | ∞ | | | |

TABLE 2

Example 1: Items (d line)

| | Wide Angle | Intermediate | Telephoto |
|---|---|---|---|
| Zoom Ratio | 1.0 | 1.9 | 3.8 |
| f | 3.67 | 6.85 | 13.82 |
| Bf | 0.50 | 0.50 | 0.50 |
| F No. | 2.88 | 3.60 | 5.55 |
| 2ω (°) | 109.60 | 63.40 | 32.96 |

TABLE 3

Example 1: Zoom Distances

| | | | |
|---|---|---|---|
| DD[6] | 13.762 | 5.380 | 1.419 |
| DD[14] | 1.014 | 1.679 | 3.143 |
| DD[16] | 3.025 | 4.595 | 12.042 |
| DD[18] | 2.595 | 4.318 | 2.878 |

TABLE 4

Example 1: Aspherical Surface Coefficients

| | Surface Number | |
|---|---|---|
| | 3 | 4 |
| KA | 1.0000000E+00 | 1.0000000E+00 |
| A3 | 1.2471921E−03 | 1.2170940E−03 |
| A4 | 8.2377649E−04 | 6.9454669E−04 |
| A5 | −2.9253968E−05 | −1.1498703E−04 |
| A6 | −7.3766154E−05 | −2.2351372E−05 |
| A7 | 1.6367046E−05 | −2.5134499E−06 |
| A8 | −1.5745968E−06 | 6.0860570E−07 |
| A9 | 1.0493931E−07 | 1.5819689E−07 |
| A10 | −2.4865000E−08 | −1.1672548E−07 |
| A11 | 6.1694579E−09 | 2.8380961E−08 |
| A12 | −5.0572454E−10 | −2.4196924E−09 |

| | Surface Number | | |
|---|---|---|---|
| | 8 | 13 | 16 |
| KA | 1.0000000E+00 | 1.0000000E+00 | 1.0000000E+00 |
| A4 | −1.1116430E−04 | −1.3595713E−03 | 1.2919375E−03 |
| A6 | −3.5641574E−06 | −4.4907634E−05 | −3.7999191E−05 |
| A8 | −2.1998583E−06 | 6.0641999E−06 | 1.5261989E−05 |
| A10 | 4.0840696E−07 | −1.4160486E−06 | −2.9221059E−06 |
| A12 | −2.4053563E−08 | 8.8304837E−08 | 1.7878791E−07 |

A through L of FIG. 6 are diagrams that illustrate various aberrations of the zoom lens of Example 1. The spherical aberration, the astigmatism, the distortion, and the lateral chromatic aberration of the zoom lens of Example 1 at the wide angle end are illustrated in A through D of FIG. 6, respectively. The spherical aberration, the astigmatism, the distortion, and the lateral chromatic aberration of the zoom lens of Example 1 at an intermediate focal distance are illustrated in E through H of FIG. 6, respectively. The spherical aberration, the astigmatism, the distortion, and the lateral chromatic aberration of the zoom lens of Example 1 at the telephoto end are illustrated in I through L of FIG. 6, respectively.

The diagrams that illustrate spherical aberration, astigmatism, and distortion show aberrations related to the d line (wavelength: 587.6 nm). The diagrams that illustrate spherical aberration show aberrations related to the d line (wavelength: 587.6 nm), aberrations related to the C line (wavelength: 656.3 nm), and aberrations related to the F line (wavelength: 486.1 nm), as solid lines, broken lines, and dotted lines, respectively. In the diagrams that illustrate astigmatism, aberrations in the sagittal direction are indicated by solid lines, while aberrations in the tangential direction are indicated by dotted lines. In the diagrams that illustrate lateral chromatic aberration, aberrations related to the C line (wavelength: 656.3 nm) and aberrations related to the F line (wavelength: 486.1 nm) are shown as broken lines and dotted lines, respectively. Note that in the diagrams that illustrate spherical aberrations, "F No." denotes F values. In the other diagrams that illustrate the aberrations, "ω" denotes half angles of view.

Figure 2:
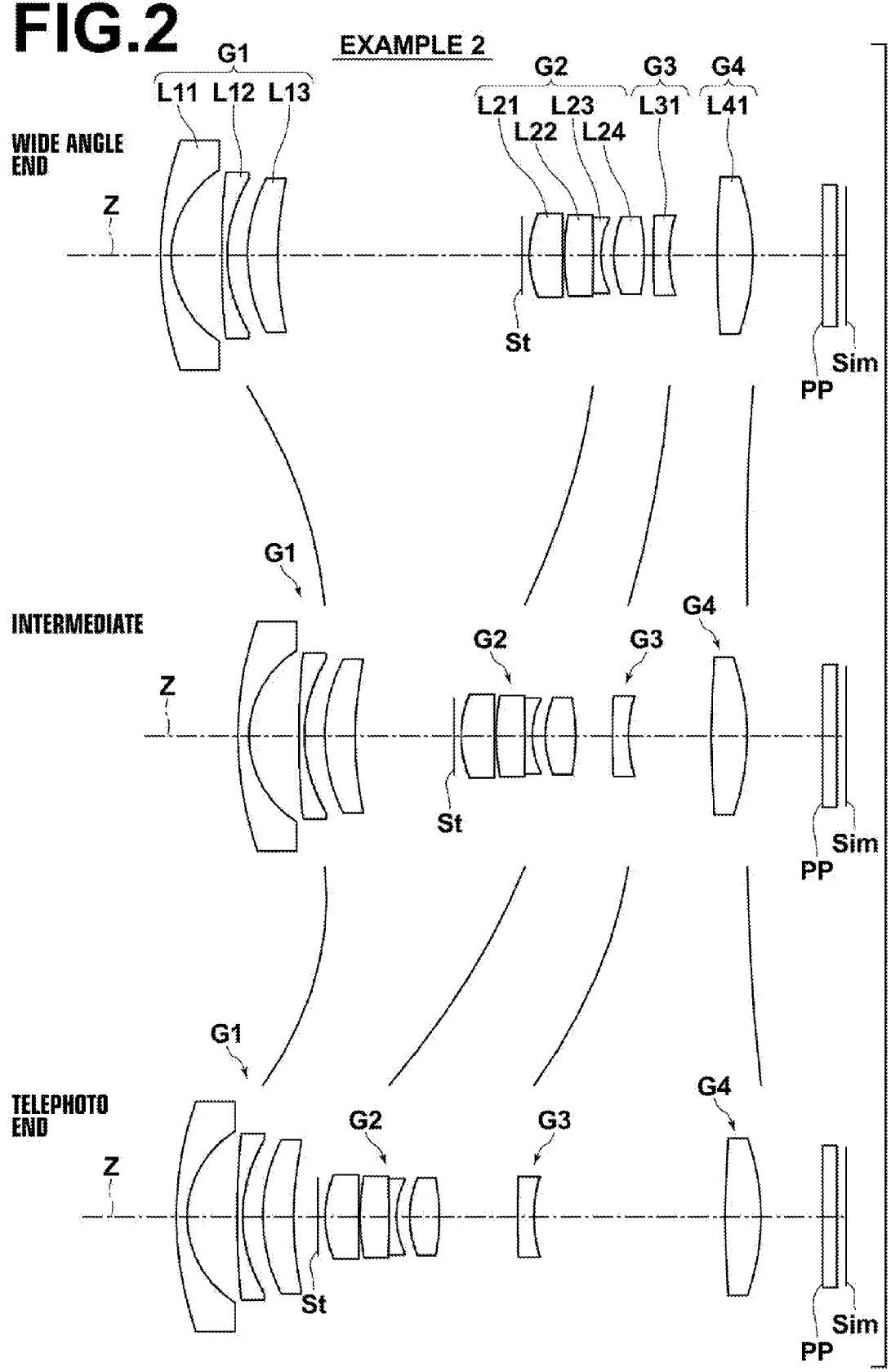
FIG. 2 is a collection of sectional diagrams that illustrate the configuration of a zoom lens according to Example 2.

Next, a zoom lens according to Example 2 will be described. FIG. 2 is a collection of sectional diagrams that illustrate the lens configuration of the zoom lens of Example 2. In addition, basic lens data of the zoom lens of Example 2 are shown in Table 5, data related to various items of the zoom lens of Example 2 are shown in Table 6, data related to the distances among movable surfaces of the zoom lens of Example 2 are shown in Table 7, data related to aspherical surface coefficients of the zoom lens of Example 2 are shown in Table 8, and various aberrations of the zoom lens of Example 2 are shown in A through L of FIG. 7.

TABLE 5

Example 2: Lens Data (N and ν are related to the d line)

| Si (Surface Number) | Ri (Radius of Curvature) | Di (Distance) | Ndj (Refractive Index) | νdj (Abbe's Number) |
|---|---|---|---|---|
| 1 | 19.9949 | 0.600 | 1.772499 | 49.60 |
| 2 | 5.8300 | 2.800 | | |
| *3 | 101.8888 | 0.300 | 1.882023 | 37.22 |
| *4 | 8.5450 | 1.134 | | |
| 5 | 10.0000 | 1.700 | 1.959060 | 17.47 |
| 6 | 20.9586 | DD[6] | | |
| 7 (stop) | ∞ | 0.400 | | |
| *8 | 6.0879 | 1.850 | 1.693500 | 53.20 |
| 9 | 789.6724 | 0.100 | | |
| 10 | 13.0285 | 1.610 | 1.592824 | 68.63 |
| 11 | −115.2901 | 0.400 | 1.688931 | 31.07 |
| 12 | 4.7527 | 0.743 | | |
| *13 | 5.5556 | 1.700 | 1.497103 | 81.56 |
| 14 | −11.5803 | DD[14] | | |

TABLE 5-continued

Example 2: Lens Data (N and ν are related to the d line)

| Si (Surface Number) | Ri (Radius of Curvature) | Di (Distance) | Ndj (Refractive Index) | νdj (Abbe's Number) |
|---|---|---|---|---|
| *15 | −390.3287 | 0.900 | 1.820798 | 42.71 |
| *16 | 10.0000 | DD[16] | | |
| 17 | 55.0097 | 2.000 | 1.733997 | 51.47 |
| 18 | −13.7929 | DD[18] | | |
| 19 | ∞ | 0.800 | 1.516798 | 64.20 |
| 20 | ∞ | | | |

TABLE 6

Example 2: Items (d line)

| | Wide Angle | Intermediate | Telephoto |
|---|---|---|---|
| Zoom Ratio | 1.0 | 1.9 | 3.8 |
| f′ | 3.67 | 6.88 | 13.82 |
| Bf′ | 0.50 | 0.50 | 0.50 |
| F No. | 2.88 | 3.65 | 5.54 |
| 2ω (°) | 107.72 | 61.90 | 32.06 |

TABLE 7

Example 2: Zoom Distances

| | | | |
|---|---|---|---|
| DD[6] | 13.611 | 5.492 | 1.359 |
| DD[14] | 0.500 | 2.043 | 4.341 |
| DD[16] | 2.642 | 4.591 | 10.642 |
| DD[18] | 3.891 | 4.214 | 3.437 |

TABLE 8

Example 2: Aspherical Surface Coefficients

| | Surface Number | |
|---|---|---|
| | 3 | 4 |
| KA | 1.0000000E+00 | 1.0000000E+00 |
| A3 | −1.5363501E−04 | −1.4324273E−04 |
| A4 | 5.8792060E−04 | 3.0961027E−04 |
| A5 | −6.5120668E−06 | 1.0481881E−04 |
| A6 | −3.1732767E−05 | −9.1240495E−05 |
| A7 | 5.6497972E−06 | 1.4766837E−05 |
| A8 | −3.4227357E−07 | 1.2891637E−06 |
| A9 | 1.0861575E−08 | −5.2232225E−07 |
| A10 | −1.1561118E−08 | −9.0347882E−08 |
| A11 | 2.9867554E−09 | 3.7812408E−08 |
| A12 | −2.2980652E−10 | −3.0931686E−09 |

| | Surface Number | | | |
|---|---|---|---|---|
| | 8 | 13 | 15 | 16 |
| KA | 1.0000000E+00 | 1.0000000E+00 | 1.0000000E+00 | 1.0000000E+00 |
| A4 | −3.2174105E−04 | −1.1772131E−03 | 2.1000620E−03 | 3.0324439E−03 |
| A6 | −1.9924572E−05 | 2.4115861E−05 | −1.6918470E−04 | −1.7441006E−04 |
| A8 | 2.5658341E−06 | −9.9095653E−06 | 1.8711665E−05 | 2.1053678E−05 |
| A10 | −3.1930641E−07 | 1.2417114E−06 | −2.0270683E−06 | −2.6260803E−06 |
| A12 | 1.3260881E−08 | −5.4068767E−08 | 6.7867056E−08 | 1.0441408E−07 |

Figure 3:
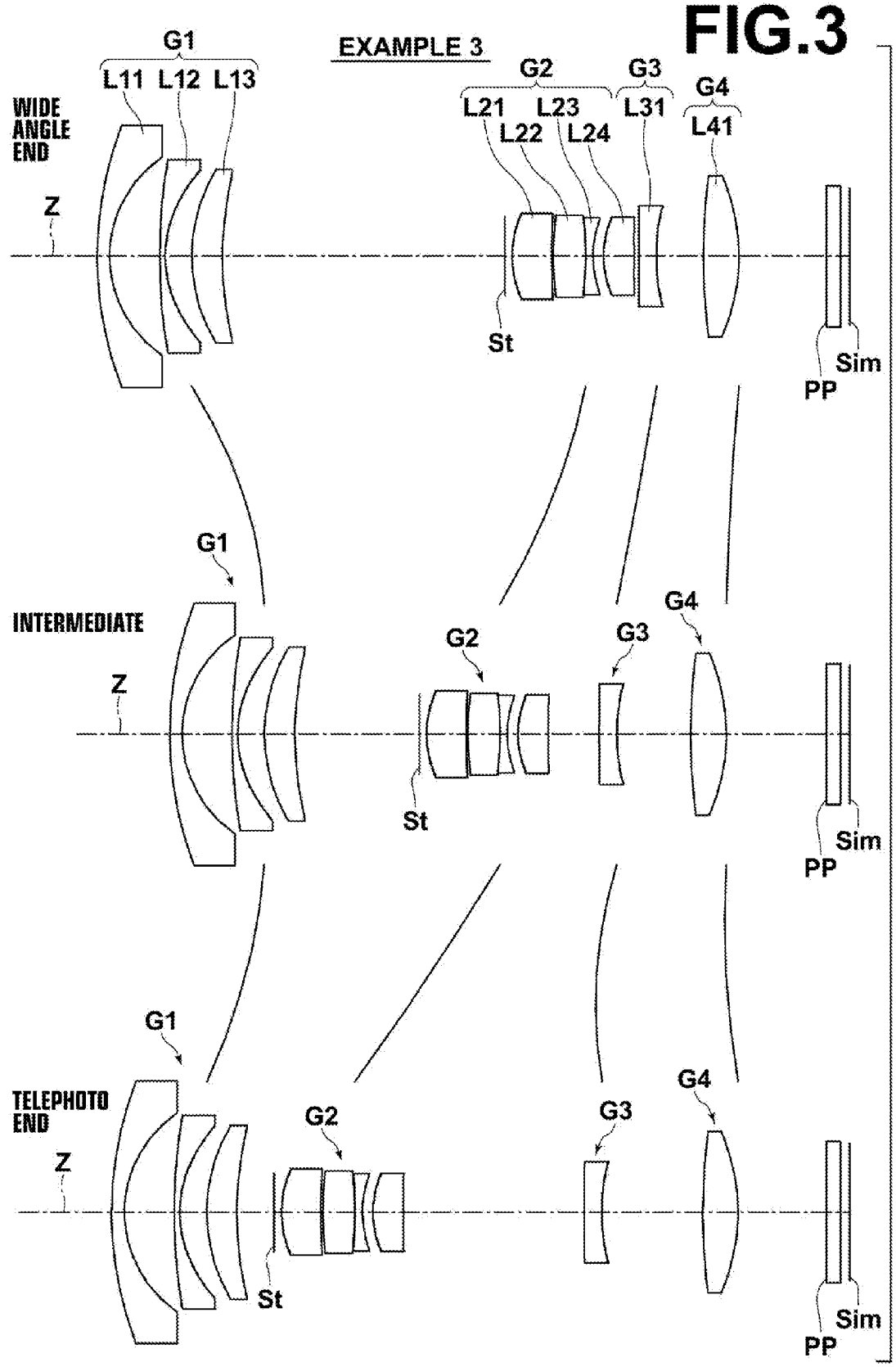
FIG. 3 is a collection of sectional diagrams that illustrate the configuration of a zoom lens according to Example 3.

Next, a zoom lens according to Example 3 will be described. FIG. 3 is a collection of sectional diagrams that illustrate the lens configuration of the zoom lens of Example 3. In addition, basic lens data of the zoom lens of Example 3 are shown in Table 9, data related to various items of the zoom lens of Example 3 are shown in Table 10, data related to the distances among movable surfaces of the zoom lens of Example 3 are shown in Table 11, data related to aspherical surface coefficients of the zoom lens of Example 3 are shown in Table 12, and various aberrations of the zoom lens of Example 3 are shown in A through L of FIG. 8.

TABLE 9

Example 3: Lens Data (N and ν are related to the d line)

| Si (Surface Number) | Ri (Radius of Curvature) | Di (Distance) | Ndj (Refractive Index) | νdj (Abbe's Number) |
|---|---|---|---|---|
| 1 | 21.4367 | 0.700 | 1.754999 | 52.32 |
| 2 | 7.0269 | 2.800 | | |
| *3 | 48.7918 | 0.300 | 1.882023 | 37.22 |
| *4 | 6.8820 | 1.500 | | |
| 5 | 10.0000 | 1.700 | 1.959060 | 17.47 |
| 6 | 21.4174 | DD[6] | | |
| 7 (stop) | ∞ | 0.400 | | |
| *8 | 6.0951 | 2.200 | 1.743300 | 49.33 |
| 9 | 35.7143 | 0.100 | | |
| 10 | 17.7010 | 1.810 | 1.592824 | 68.63 |
| 11 | −22.3709 | 0.400 | 1.728250 | 28.46 |
| 12 | 6.2265 | 0.600 | | |
| *13 | 5.5555 | 1.700 | 1.497103 | 81.56 |
| *14 | −136.0065 | DD[14] | | |
| *15 | 450.0996 | 1.000 | 1.820798 | 42.71 |
| *16 | 13.8798 | DD[16] | | |
| 17 | 37.1149 | 1.993 | 1.693501 | 53.21 |
| 18 | −11.7781 | DD[18] | | |
| 19 | ∞ | 0.800 | 1.516798 | 64.20 |
| 20 | ∞ | | | |

TABLE 10

Example 3: Items (d line)

| | Wide Angle | Intermediate | Telephoto |
|---|---|---|---|
| Zoom Ratio | 1.0 | 1.9 | 3.8 |
| f' | 3.67 | 6.88 | 13.83 |
| Bf' | 0.50 | 0.50 | 0.50 |
| F No. | 2.88 | 3.71 | 5.57 |
| 2ω (°) | 107.68 | 62.48 | 31.62 |

TABLE 11

Example 3: Zoom Distances

| | | | |
|---|---|---|---|
| DD[6] | 15.803 | 6.974 | 2.087 |
| DD[14] | 0.250 | 2.830 | 10.106 |
| DD[16] | 2.622 | 4.123 | 5.623 |
| DD[18] | 4.864 | 5.566 | 4.910 |

TABLE 12

Example 3: Aspherical Surface Coefficients

| | Surface Number | |
|---|---|---|
| | 3 | 4 |
| KA | 1.0000000E+00 | 1.0000000E+00 |
| A3 | 3.5066958E−04 | 3.4858892E−04 |
| A4 | 1.9359941E−04 | −1.3011271E−04 |
| A5 | 4.9050107E−05 | 1.5084801E−04 |
| A6 | −2.5325866E−05 | −8.8857996E−05 |
| A7 | 2.7931493E−06 | 1.5260193E−05 |
| A8 | −7.0110841E−08 | 9.6842105E−07 |
| A9 | 7.1526164E−09 | −6.1879153E−07 |
| A10 | −1.0803832E−08 | −6.3566320E−08 |
| A11 | 2.8175603E−09 | 3.7592144E−08 |
| A12 | −2.1586886E−10 | −3.2625880E−09 |

| | Surface Number | | | | |
|---|---|---|---|---|---|
| | 8 | 13 | 14 | 15 | 16 |
| KA | 1.0000000E+00 | 1.0000000E+00 | 1.0000000E+00 | 1.0000000E+00 | 1.0000000E+00 |
| A4 | −8.5929041E−05 | −5.3705970E−04 | 1.6539674E−03 | 3.3863863E−04 | 8.4888994E−04 |
| A6 | −4.5645412E−06 | 6.2961265E−06 | 4.8875406E−05 | −2.8596100E−05 | −3.9881402E−05 |
| A8 | 1.1593868E−06 | −1.1723697E−05 | −6.8491919E−06 | 2.3977615E−06 | 3.9608450E−06 |
| A10 | −1.7453734E−07 | 1.1464639E−06 | 7.9375254E−07 | 4.0344562E−08 | −8.3558175E−08 |
| A12 | 1.1000262E−08 | −1.6790893E−07 | −1.6508704E−07 | −1.7574828E−08 | −1.1836637E−08 |

Figure 4:
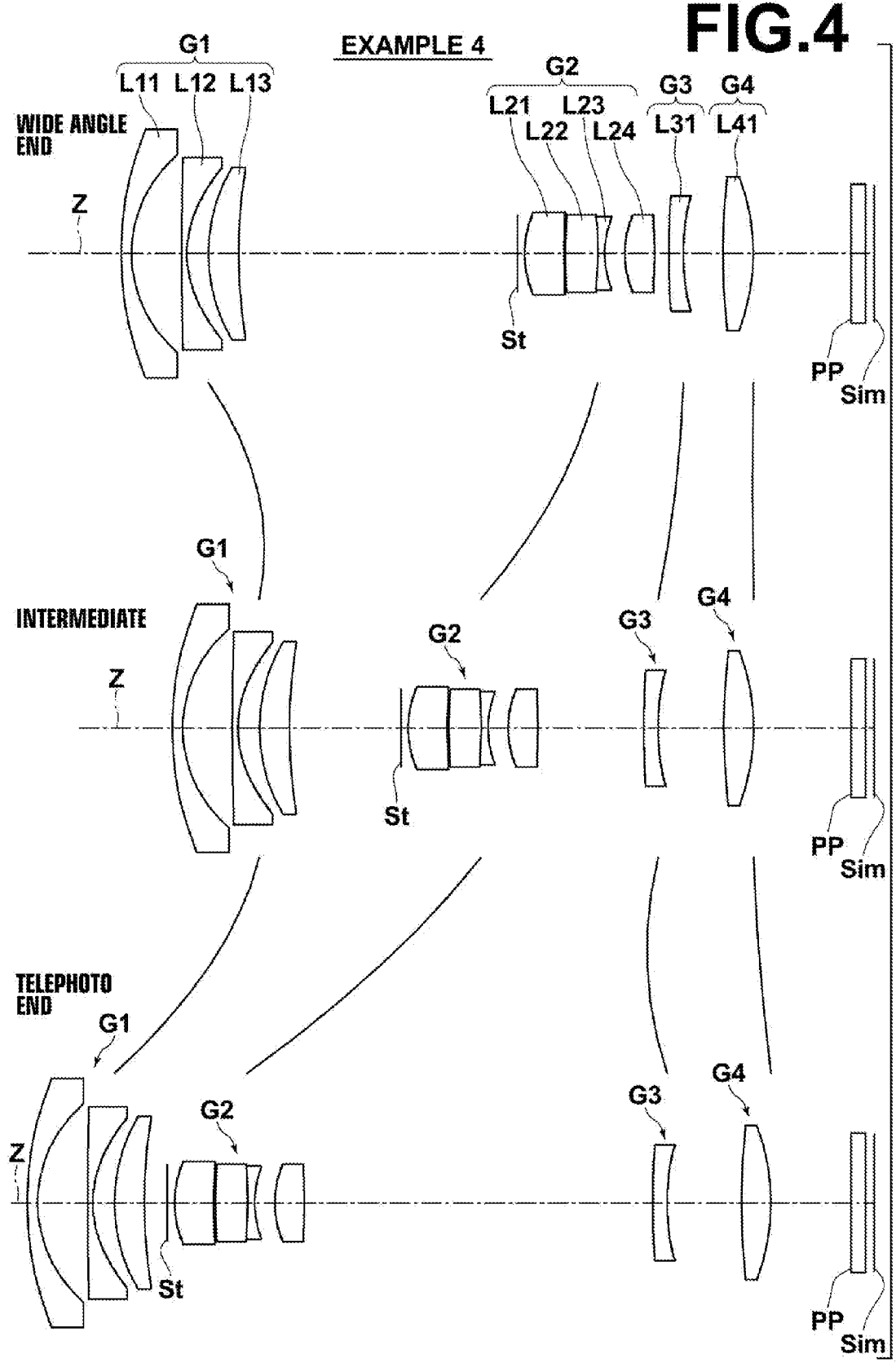
FIG. 4 is a collection of sectional diagrams that illustrate the configuration of a zoom lens according to Example 4.

Next, a zoom lens according to Example 4 will be described. FIG. 4 is a collection of sectional diagrams that illustrate the lens configuration of the zoom lens of Example 4. In addition, basic lens data of the zoom lens of Example 4 are shown in Table 13, data related to various items of the zoom lens of Example 4 are shown in Table 14, data related to the distances among movable surfaces of the zoom lens of Example 4 are shown in Table 15, data related to aspherical surface coefficients of the zoom lens of Example 4 are shown in Table 16, and various aberrations of the zoom lens of Example 4 are shown in A through L of FIG. 9.

TABLE 13

Example 4: Lens Data (N and ν are related to the d line)

| Si (Surface Number) | Ri (Radius of Curvature) | Di (Distance) | Ndj (Refractive Index) | νdj (Abbe's Number) |
|---|---|---|---|---|
| 1 | 19.3048 | 0.600 | 1.806098 | 40.92 |
| 2 | 7.7106 | 2.800 | | |
| *3 | 576.9723 | 0.300 | 1.882023 | 37.22 |
| *4 | 6.4631 | 1.201 | | |
| 5 | 10.0568 | 1.700 | 1.959060 | 17.47 |
| 6 | 31.9652 | DD[6] | | |
| 7 (stop) | ∞ | 0.400 | | |
| *8 | 5.9856 | 2.200 | 1.743300 | 49.33 |
| 9 | 36.0581 | 0.100 | | |
| 10 | 37.6079 | 1.810 | 1.592824 | 68.63 |
| 11 | −27.0306 | 0.400 | 1.728250 | 28.46 |
| 12 | 5.9384 | 1.124 | | |
| *13 | 5.8580 | 1.655 | 1.497103 | 81.56 |
| *14 | −26.2891 | DD[14] | | |

TABLE 13-continued

Example 4: Lens Data (N and ν are related to the d line)

| Si (Surface Number) | Ri (Radius of Curvature) | Di (Distance) | Ndj (Refractive Index) | νdj (Abbe's Number) |
|---|---|---|---|---|
| *15 | 108.5764 | 0.800 | 1.820798 | 42.71 |
| *16 | 16.7690 | DD[16] | | |
| 17 | 40.8633 | 1.700 | 1.691002 | 54.82 |
| 18 | −12.5566 | DD[18] | | |
| 19 | ∞ | 0.800 | 1.516798 | 64.20 |
| 20 | ∞ | | | |

TABLE 14

Example 4: Items (d line)

| | Wide Angle | Intermediate | Telephoto |
|---|---|---|---|
| Zoom Ratio | 1.0 | 2.1 | 4.7 |
| f | 3.67 | 7.64 | 17.29 |
| Bf | 0.50 | 0.50 | 0.49 |
| F No. | 2.88 | 3.96 | 6.52 |
| 2ω (°) | 107.56 | 56.02 | 24.74 |

TABLE 15

Example 4: Zoom Distances

| | | | |
|---|---|---|---|
| DD[6] | 15.681 | 6.267 | 1.293 |
| DD[14] | 0.834 | 5.965 | 19.601 |
| DD[16] | 2.217 | 3.683 | 4.143 |
| DD[18] | 5.518 | 5.474 | 4.500 |

TABLE 16

Example 4: Aspherical Surface Coefficients

| | Surface Number | |
|---|---|---|
| | 3 | 4 |
| KA | 1.0000000E+00 | 1.0000000E+00 |
| A3 | 4.8799744E−04 | 4.8157555E−04 |
| A4 | 2.5110353E−05 | −4.8204751E−04 |
| A5 | 2.0697385E−05 | 1.3850209E−04 |
| A6 | −2.1429136E−05 | −9.3613867E−05 |
| A7 | 3.7940461E−06 | 1.6946569E−05 |
| A8 | −3.8051735E−08 | 1.0351187E−06 |
| A9 | −3.2595455E−09 | −6.0944155E−07 |
| A10 | −1.3217457E−08 | −5.7943464E−08 |
| A11 | 2.3367553E−09 | 3.3448197E−08 |
| A12 | −1.2292186E−10 | −2.9307530E−09 |

| | Surface Number | | | | |
|---|---|---|---|---|---|
| | 8 | 13 | 14 | 15 | 16 |
| KA | 1.0000000E+00 | 1.0000000E+00 | 1.0000000E+00 | 1.0000000E+00 | 1.0000000E+00 |
| A4 | −1.9033166E−04 | −1.2692999E−04 | 1.3331035E−03 | 6.1422580E−04 | 1.0483846E−03 |
| A6 | −9.0324463E−06 | 9.7823565E−05 | 1.1370387E−04 | −2.6956282E−05 | −3.5634155E−05 |
| A8 | 8.6724811E−07 | −1.5340896E−05 | −1.1157298E−05 | −2.5835199E−07 | 8.5031345E−07 |
| A10 | −3.3530400E−08 | 2.5716684E−06 | 2.7039391E−06 | 9.9475640E−08 | 2.6348966E−08 |
| A12 | −1.6233160E−09 | −1.5572910E−07 | −1.8141152E−07 | −4.8327870E−09 | −2.9592798E−09 |

Figure 5:
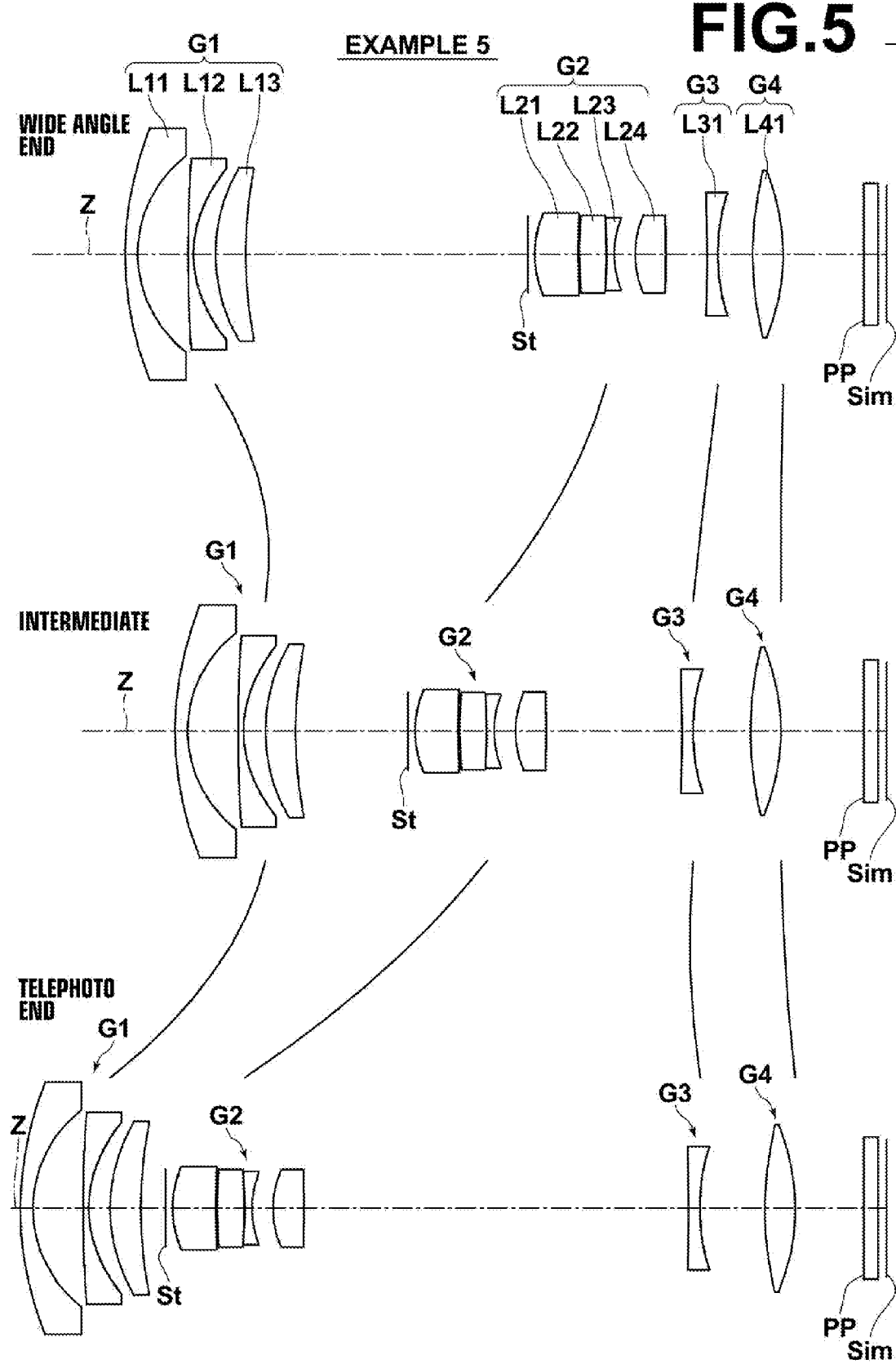
FIG. 5 is a collection of sectional diagrams that illustrate the configuration of a zoom lens according to Example 5.
Figure 10:
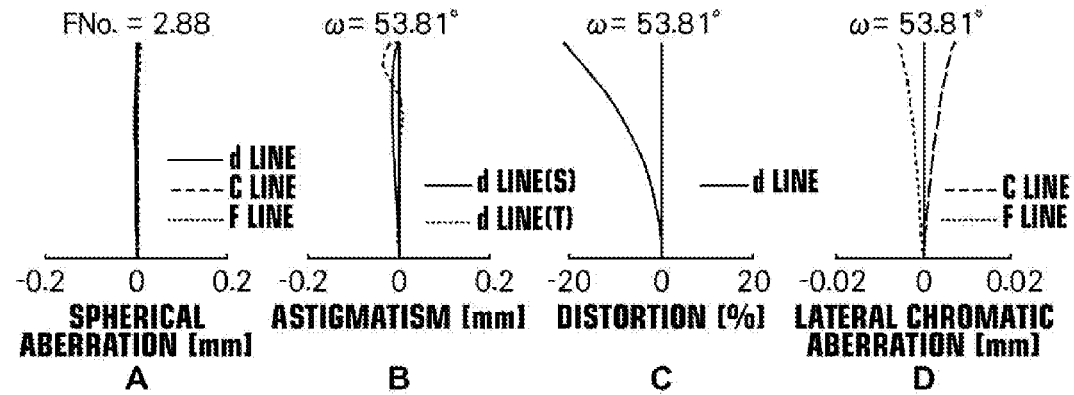
FIG. 10 is a collection of diagrams (A through L) that illustrate aberrations of the zoom lens of Example 5.

Next, a zoom lens according to Example 5 will be described. FIG. 5 is a collection of sectional diagrams that illustrate the lens configuration of the zoom lens of Example 5. In addition, basic lens data of the zoom lens of Example 5 are shown in Table 17, data related to various items of the zoom lens of Example 5 are shown in Table 18, data related to the distances among movable surfaces of the zoom lens of Example 5 are shown in Table 19, data related to aspherical surface coefficients of the zoom lens of Example 5 are shown in Table 20, and various aberrations of the zoom lens of Example 5 are shown in A through L of FIG. 10.

TABLE 17

Example 5: Lens Data (N and ν are related to the d line)

| Si (Surface Number) | Ri (Radius of Curvature) | Di (Distance) | Ndj (Refractive Index) | νdj (Abbe's Number) |
|---|---|---|---|---|
| 1 | 19.8996 | 0.700 | 1.834807 | 42.73 |
| 2 | 7.3468 | 2.796 | | |
| *3 | 159.9952 | 0.300 | 1.882023 | 37.22 |
| *4 | 7.0880 | 1.209 | | |
| 5 | 10.0323 | 1.700 | 1.959060 | 17.47 |
| 6 | 27.2238 | DD[6] | | |
| 7 (stop) | ∞ | 0.400 | | |
| *8 | 6.0131 | 2.391 | 1.743300 | 49.33 |
| 9 | 38.1236 | 0.100 | | |
| 10 | 29.6621 | 1.514 | 1.592824 | 68.63 |
| 11 | −31.0623 | 0.400 | 1.728250 | 28.46 |
| 12 | 5.9255 | 1.201 | | |
| 13 | 6.0183 | 1.700 | 1.497103 | 81.56 |
| *14 | −36.3049 | DD[14] | | |
| 15 | −86.8863 | 0.612 | 1.603420 | 38.03 |
| *16 | 14.0511 | DD[16] | | |
| 17 | 20.5003 | 1.700 | 1.712995 | 53.87 |
| 18 | −12.9547 | DD[18] | | |
| 19 | ∞ | 0.800 | 1.516798 | 64.20 |
| 20 | ∞ | | | |

TABLE 18

Example 5: Items (d line)

| | Wide Angle | Intermediate | Telephoto |
|---|---|---|---|
| Zoom Ratio | 1.0 | 2.1 | 4.7 |
| f | 3.67 | 7.65 | 17.29 |
| Bf | 0.50 | 0.50 | 0.50 |
| F No. | 2.88 | 3.96 | 6.59 |
| 2ω (°) | 107.62 | 56.06 | 24.78 |

TABLE 19

Example 5: Zoom Distances

| | | | |
|---|---|---|---|
| DD[6] | 15.684 | 6.232 | 1.360 |
| DD[14] | 2.282 | 7.564 | 21.430 |
| DD[16] | 1.917 | 3.177 | 3.603 |
| DD[18] | 4.472 | 4.597 | 3.795 |

TABLE 20

Example 5: Aspherical Surface Coefficients

| | Surface Number | |
|---|---|---|
| | 3 | 4 |
| KA | 1.9999947E+00 | 1.3066116E+00 |
| A3 | 8.2540534E−04 | 8.1591730E−04 |
| A4 | 1.9192853E−05 | −4.8462353E−04 |
| A5 | −3.2552550E−06 | 1.5524588E−04 |
| A6 | −1.7703457E−05 | −1.0848602E−04 |
| A7 | 3.3663269E−06 | 1.8579121E−05 |
| A8 | 1.5874259E−07 | 1.6117182E−06 |
| A9 | −1.8289684E−10 | −7.1818368E−07 |
| A10 | −2.0858117E−08 | −4.8246119E−08 |
| A11 | 2.9424973E−09 | 3.1375005E−08 |
| A12 | −1.1907370E−10 | −2.7909109E−09 |

| | Surface Number | | |
|---|---|---|---|
| | 8 | 14 | 16 |
| KA | 2.6419172E−01 | 1.0000000E+00 | 1.0000000E+00 |
| A4 | 2.2521377E−04 | 1.3999361E−03 | 5.3349439E−04 |
| A6 | 1.2748579E−05 | 5.5578828E−05 | 7.2731105E−06 |
| A8 | −2.6052711E−06 | −1.3935968E−05 | −1.2801528E−06 |
| A10 | 4.1531683E−07 | 3.3717259E−06 | 9.1122966E−08 |
| A12 | −2.3790421E−08 | −2.5477049E−07 | −2.2527272E−09 |

Table 21 shows values corresponding to Conditional Formulae (1) through (5) for Examples 1 through 5. Note that all of the Examples use the d line as a reference wavelength, and the values shown in Table 21 are those with respect to the reference wavelength.

TABLE 21

| Formula Condition | Example 1 | Example 2 | Example 3 | Example 4 | Example 5 |
|---|---|---|---|---|---|
| (1) 1.75 < ndave < 1.92 | 1.81 | 1.83 | 1.82 | 1.84 | 1.86 |
| (2) 0.80 < (r12f + r12r)/(r12f − r12r) < 1.70 | 1.48 | 1.18 | 1.33 | 1.02 | 1.09 |
| (3) 9.0 < TLw/fw < 12.5 | 10.39 | 10.41 | 11.46 | 11.54 | 11.55 |
| (4) 2.5 < X2/fw < 6.1 | 3.12 | 3.10 | 3.52 | 5.35 | 5.50 |
| (5) 0.40 < (r31f + r31r)/(r31f − r31r) < 1.60 | 0.98 | 0.95 | 1.06 | 1.37 | 0.72 |

Based on the data above, all of the zoom lenses of Examples 1 through 5 satisfy Conditional Formulae (1) through (5). It can be understood that the zoom lenses of Examples 1 through 5 have sufficiently wide angles of view at the wide angle end of 100° or greater, secure comparatively bright F numbers throughout the entire range from the wide angle end to the telephoto end, and have short total lengths, thereby achieving miniaturization.

Figure 11:
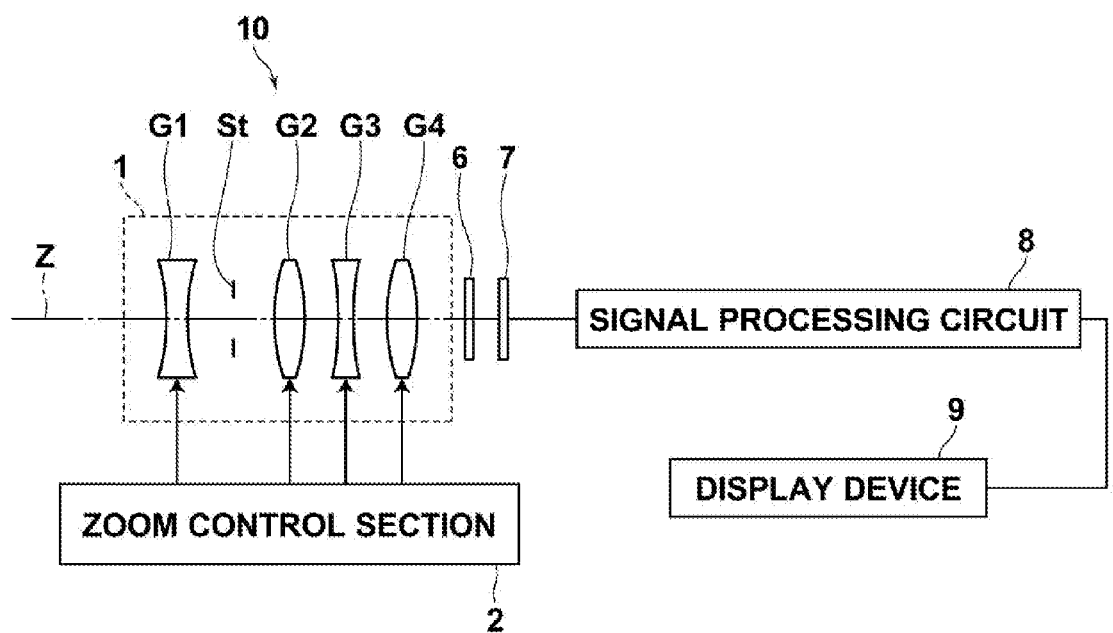
FIG. 11 is a schematic diagram that illustrates the configuration of an imaging apparatus according to an embodiment of the present disclosure.

Next, an imaging apparatus according to an embodiment of the present disclosure will be described. FIG. 11 is a schematic diagram that illustrates the configuration of an imaging apparatus equipped with a zoom lens according to an embodiment of the present disclosure as an example of an imaging apparatus according to the embodiment of the present disclosure. Note that FIG. 11 schematically illustrates each of the lens groups. Examples of this imaging apparatus include a video camera and an electronic still camera having a solid state imaging element such as a CCD and a CMOS as a recording medium.

The imaging apparatus 10 illustrated in FIG. 11 is equipped with an imaging lens 1, a filter 6 that functions as a low pass filter or the like, provided toward the image side of the imaging lens 1, an imaging element 7 provided toward the image side of the filter 6, and a signal processing circuit 8. The imaging element 7 converts optical images formed by the imaging lens 1 into electrical signals. A CCD (Charge Coupled Device) or a CMOS (Complementary Metal Oxide Semiconductor) may be employed as the imaging element 7, for example. The imaging element 7 is provided such that the imaging surface thereof is positioned at the image formation plane of the imaging lens 1.

Images obtained by the imaging lens 1 are formed on the imaging surface of the imaging element 7. Output signals from the imaging element 7 related to the images undergo calculation processes at the signal processing circuit 8, and the images are displayed by a display device 9.

The present disclosure has been described in connection with the embodiments and the Examples. However, the zoom lens of the present disclosure is not limited to the embodiments and Examples described above, and various modifications are possible. For example, the values of the radii of curvature, the distances among surfaces, and the refractive indices, etc., of each lens component are not limited to the numerical values indicated in connection with the Examples, and may be other values.

What is claimed is:

1. A zoom lens consisting of, in order from the object side to the image side:
   a first lens group having a negative refractive power;
   a stop;
   a second lens group having a positive refractive power;
   a third lens group having a negative refractive power; and
   a fourth lens group having a positive refractive power,
   all of the lens groups moving along the optical axis when changing magnification from the wide angle end to the telephoto end such that the distance between the first lens group and the second lens group decreases and the distance between the second lens group and the third lens group increases;
   the first lens group having only three lenses, said three lenses of said first lens group consisting of, in order from the object side to the image side, a first lens of the first lens group having a negative refractive power, a second lens of the first lens group having a negative refractive power, and a third lens of the first lens group having a positive refractive power;
   the second lens group having only four lenses, said four lenses of said second lens group consisting of, in order from the object side to the image side, a first lens of the second lens group having a positive refractive power, a second lens of the second lens group having a positive refractive power, a third lens of the second lens group having a negative refractive power, and a fourth lens of the second lens group having a positive refractive power; and
   the conditional formula below being satisfied:

$$1.75 < ndave < 1.92 \quad (1)$$

wherein ndave is the average refractive index of the first lens of the first lens group and the second lens of the first lens group with respect to the d line (wavelength: 587. 6 nm).

2. The zoom lens as defined in claim 1, wherein:
   the second lens of the first lens group has at least one aspherical surface, and the conditional formula below is satisfied:

$$0.80 < (r12f + r12r)/(r12f - r12r) < 1.70 \quad (2)$$

wherein r12f is the paraxial radius of curvature of the second lens of the first lens group toward the object side, and r12r is the paraxial radius of curvature of the second lens of the first lens group toward the image side.

3. The zoom lens as defined in claim 1, wherein:
   the conditional formula below is satisfied:

$$9.0 < TLw/fw < 12.5 \quad (3)$$

wherein TLw is the distance from the apex of the lens surface most toward the object side to an image formation plane at the wide angle end, and fw is the focal length of the entire zoom lens at the wide angle end.

4. The zoom lens as defined in claim 1, wherein:
   the conditional formula below is satisfied:

$$2.5 < X2/fw < 6.1 \quad (4)$$

wherein X2 is the amount of movement of the second lens group from the wide angle end to the telephoto end, and fw is the focal length of the entire zoom lens at the wide angle end.

5. The zoom lens as defined in claim 1, wherein:
   the third lens group consists of only one lens, the one lens of the third lens group having a negative refractive power, the one lens of the third lens group having at least one aspherical surface, and the conditional formula below is satisfied:

$$0.40 < (r31f + r31r)/(r31f - r31r) < 1.60 \quad (5)$$

wherein r31f is the paraxial radius of curvature of the one lens of the third lens group toward the object side, and r31r is the paraxial radius of curvature of the one lens of the third lens group toward the image side.

6. The zoom lens as defined in claim 1, wherein:
   focusing operations are performed by moving the fourth lens group in the direction of the optical axis.

7. The zoom lens as defined in claim 1, wherein:
   the fourth lens group consists of only one lens, the one lens of the fourth lens group having a positive refractive power.

8. The zoom lens as defined in claim 1, wherein the conditional formula below is satisfied:

$$1.78 < ndave < 1.88 \quad (1\text{-}1).$$

9. The zoom lens as defined in claim 1, wherein:
   the second lens of the first lens group has at least one aspherical surface, and the conditional formula below is satisfied:

$$1.00 < (r12f + r12r)/(r12f - r12r) < 1.50 \quad (2\text{-}1)$$

wherein r12f is the paraxial radius of curvature of the second lens of the first lens group toward the object side, and r12r is the paraxial radius of curvature of the second lens of the first lens group toward the image side.

10. The zoom lens as defined in claim 1, wherein the conditional formula below is satisfied:

$$10.0 < TLw/fw < 11.8 \quad (3\text{-}1)$$

wherein TLw is the distance from the apex of the lens surface most toward the object side to an image formation plane at the wide angle end, and fw is the focal length of the entire zoom lens at the wide angle end.

11. The zoom lens as defined in claim 1, wherein the conditional formula below is satisfied:

$$2.9 < X2/fw < 5.7 \tag{4-1}$$

wherein X2 is the amount of movement of the second lens group from the wide angle end to the telephoto end, and fw is the focal length of the entire zoom lens at the wide angle end.

12. The zoom lens as defined in claim 1, wherein:

the third lens group consists of only one lens, the one lens of the third lens group having a negative refractive power, the one lens of the third lens group having at least one aspherical surface, and the conditional formula below is satisfied:

$$0.70 < (r31f + r31r)/(r31f - r31r) < 1.40 \tag{5-1}$$

wherein r31f is the paraxial radius of curvature of the one lens of the third lens group toward the object side, and r31r is the paraxial radius of curvature of the one lens of the third lens group toward the image side.

13. An imaging apparatus equipped with the zoom lens defined in claim 1.

* * * * *